United States Patent
Chang et al.

(10) Patent No.: US 6,977,980 B2
(45) Date of Patent: Dec. 20, 2005

(54) TIMING SYNCHRONIZATION METHODS AND SYSTEMS FOR TRANSMIT PARALLEL INTERFACES

(75) Inventors: Kun-Yung Ken Chang, Los Altos, CA (US); Chaofeng Huang, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 848 days.

(21) Appl. No.: 09/942,198

(22) Filed: Aug. 29, 2001

(65) Prior Publication Data

US 2003/0043943 A1 Mar. 6, 2003

(51) Int. Cl.⁷ .................................. H04L 7/00
(52) U.S. Cl. ............... 375/354; 327/141; 370/503; 709/248
(58) Field of Search ......................... 375/354

(56) References Cited

U.S. PATENT DOCUMENTS

| | | | |
|---|---|---|---|
| 3,646,517 A * | 2/1972 | Waters et al. .............. | 714/811 |
| 4,461,013 A * | 7/1984 | Lese et al. ................ | 375/306 |
| 4,727,541 A * | 2/1988 | Mori et al. ............... | 370/535 |
| 4,965,797 A * | 10/1990 | Yamane et al. ........... | 370/537 |
| 6,009,107 A * | 12/1999 | Arvidsson et al. ........ | 370/535 |
| 6,335,696 B1 * | 1/2002 | Aoyagi et al. ............ | 341/100 |
| 6,430,242 B1 * | 8/2002 | Buchanan et al. ........ | 375/371 |
| 2002/0085655 A1 * | 7/2002 | Johnson ................... | 375/354 |
| 2002/0091885 A1 * | 7/2002 | Hendrickson et al. .... | 710/100 |

* cited by examiner

Primary Examiner—Stephen Chin
Assistant Examiner—Erin M. File
(74) Attorney, Agent, or Firm—Shemwell Mahamedi LLP

(57) ABSTRACT

Transmit parallel interfaces and methods are provided in which a clock signal is generated that maximizes the setup and hold window of input data. In at least some embodiments, a divider circuit provides a clock signal in one clock domain that has a rising edge located very close to the falling edge of a system clock in another clock domain.

20 Claims, 4 Drawing Sheets

TIMING SYNCHRONIZATION METHODS AND SYSTEMS FOR TRANSMIT PARALLEL INTERFACES

TECHNICAL FIELD

This invention relates to transmit parallel interfaces and, more particularly to timing synchronization methods and systems for use in connection with transmit parallel interfaces.

BACKGROUND

Transmitting certain types of data can involve transforming the data from a parallel state into a serial state for transmission. Once the data is transmitted in its serial state, it can be de-serialized into it former parallel state. For example, assume that 10 bits (in a parallel state) at 200 MHz are desired to be transmitted from a transmitter to a receiver. To effectuate transmission, the 10 bits can be converted (i.e. serialized) to individual bits and transmitted at 2.5 Gbit/second. At the receiving end, the transmitted bit stream can be converted back into its parallel state by a de-serializer that provides the data as 10 bits at 200 MHz.

The process of serializing and de-serializing data necessarily brings into play the clock domains associated with both the input data and the serializer/de-serializer. Consider, for example, FIG. 1, which shows a typical transmit parallel interface 100. On a so-called user side, parallel data 102 resides in an environment associated with a first clock domain, say clock domain A. On the serializer/de-serializer side, the data resides in an environment associated with a second clock domain, say clock domain B. Since the clocks in the two domains can be from different clock sources, the timing relationship of the two can be arbitrary. Parallel data 102 is typically received by a circuit element, such as one or more flip flops 104 that are clocked in domain B, and then provided to a serializer 106 for serialization and then subsequent transmission.

An important problem associated with the transmit parallel interface 100 pertains to how to safely transmit the data from one clock domain to another clock domain. Specifically, timing synchronization for the transmit parallel interface of high speed I/O is needed to avoid any setup time or hold time violation for the input data of the transmit parallel interface. One way of doing this is to ensure that the setup and hold window for the data is sufficient. The setup and hold time constraint requires data to be valid for certain amount of time relative to a time reference. Otherwise, the data cannot be received correctly. The implementation can affect system clocking complexity and data latency, as is known.

For example, in the past, attempts to align the clocks on both sides of the interface have been made, but have been found to be inadequate. Specifically, some implementations attempt to align the clocks on both sides of the interface by using feedback circuitry such as phase-locked loops. This solution adds clocking complexity that can be undesirable in many instances. Other implementations have attempted to use FIFO or flip flop pairs. These implementations, however, increase data latency as well as the design complexities in generating the pointer select.

Accordingly, this invention arose out of concerns associated with providing improved timing synchronization methods and systems for use with transmit parallel interfaces, that reduce clocking complexities and mitigate data latency concerns.

DETAILED DESCRIPTION

Overview

In various embodiments described below, a transmit parallel interface is provided in which the input data is first clocked by a system clock which is provided by the user to acquire the data without timing errors and then an internal clock signal is generated that maximizes the timing window to be used to receive the reclocked data. In some embodiments, this is done by providing a clock signal (designated as "TclkPar") in one clock domain that has a rising edge located close to the falling edge of a system clock in another clock domain. This helps to reduce error from one clock domain to the other clock domain.

Exemplary Embodiment

Figure 1:
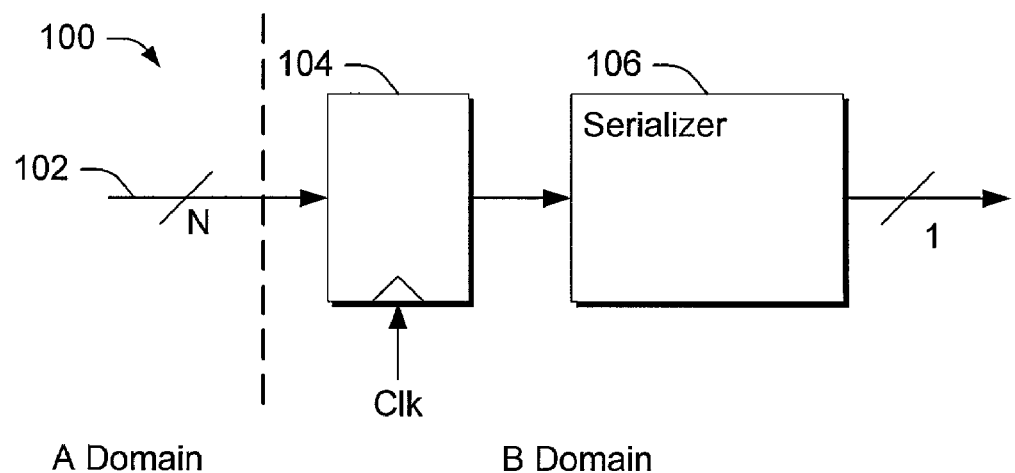
FIG. 1 is a block diagram of an exemplary transmit parallel interface in accordance with the prior art.
Figure 2:
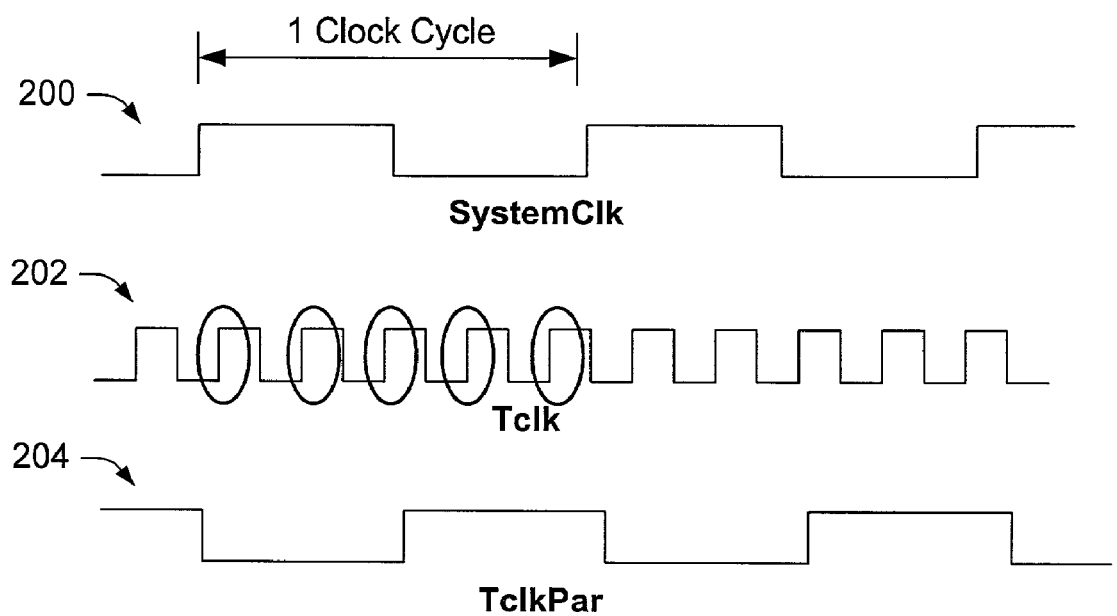
FIG. 2 is a timing diagram of the FIG. 1 transmit parallel interface.

FIG. 2 shows a timing diagram of a transmit parallel interface in which an ideal TclkPar signal is generated. A system clock 200 designated as "SystemClk" represents a clock used by the input data (i.e. parallel data) in the user's clock domain. A high speed clock 202, designated "Tclk," is provided and is used to clock a transmitter that transmits serialized data. Typically, Tclk is N times faster than SystemClk. TclkPar 204 constitutes the divided clock of Tclk for the parallel interface and has, in this example, the same frequency as the SystemClk. TclkPar is the clock in a second clock.

In the embodiments described below, the system clock (SystemClk 200) is at a dividable frequency of Tclk. More specifically, there should be no frequency deviation between SystemClk and TclkPar. In addition, the divide ratio between the clocks should be no less than four. However, the same idea can be applicable to the case where the frequency of SystemClk is half, one quarter, or ($\frac{1}{2}^N$) of the frequency of TclkPar.

In FIG. 2, there are five Tclk rise edges within a SystemClk cycle. In this example, the clock-divide-ratio is five between Tclk and SystemClk. TclkPar, which rises after a clock-to-q delay from one of the five Tclk rise edges, is chosen from the Tclk edge that is closest to the falling edge of SystemClk. Assuming the clock-to-q delay is zero in all the flip-flops involved, this clock placement of TclkPar can tolerate most timing variations due to clock path mismatches and clock jitter. In reality, where the clock-to-q delay is nonzero, one can add the same delay in some of the paths to cancel its effect.

Exemplary Circuit Implementation

Figure 3:
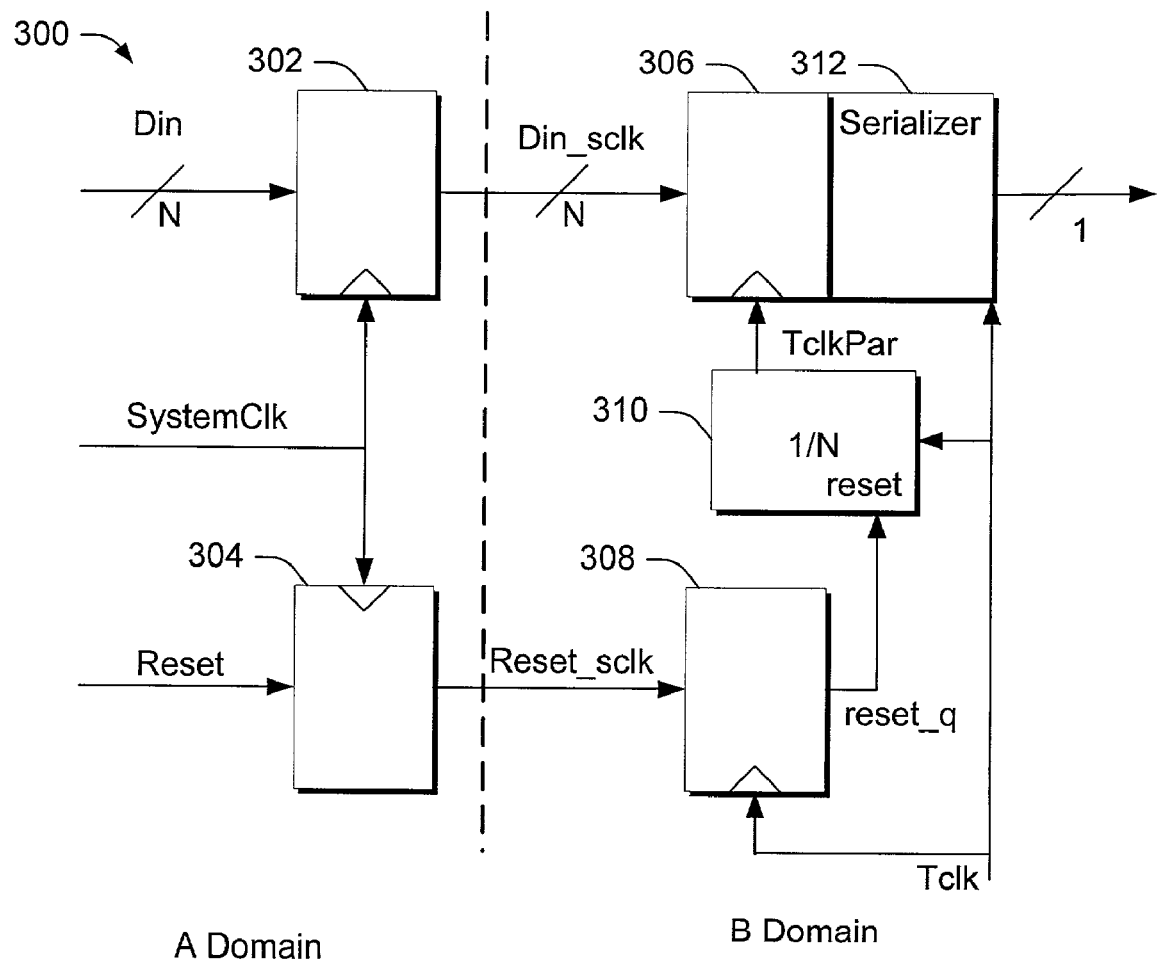
FIG. 3 is a block diagram of an exemplary transmit parallel interface in accordance with one embodiment.

FIG. 3 shows an exemplary transmit parallel interface circuit implementation 300 that generates a desirable TclkPar signal that can ensure that the setup and hold window of the input data is maximized.

In the described embodiment, circuit 300 is desirably fabricated on a single chip, although such need not be the case. In the illustrated example, TclkPar is generated by a clock divider (1/N) using Tclk. Since TclkPar is generated by a clock divider using Tclk, one can select one of N>=4 Tclk to place TclkPar around the falling edge of the SystemClk.

In the illustrated example, circuit 300 includes flip flop assemblies 302, 304, 306 and 308. The flip flop assemblies can include one or more flip flops. A clock divider circuit 310 is provided, as is a serializer circuit 312. Standard clock divider and serializer circuits can be used as will be appreciated by those of skill in the art.

One goal of the circuit about to be described is to generate a clock signal (in this case TclkPar) having a rising edge that is placed in a desirable location so that data can be safely sent from one clock domain to another. Recall that the input data has some particular relationship to the system clock in the first domain. In our example, the clock in the first domain is the SystemClk. Circuit 300 then places the second domain clock (i.e. TclkPar) at the right place so that the input data can be sent safely from one domain to another.

Specifically, we know, in this example, that within one SystemClk cycle, the best place to place the second domain clock (TclkPar) is on or around the falling edge of the SystemClk. This helps to ensure that the reclocked input data can be clocked by TclkPar with maximum tolerance on clock uncertainty. It is to be appreciated that this specific clock placement constitutes but one example of where the second domain clock can be placed. Accordingly, it is possible to use the principles described in this document to place the second domain clock in a position other than the falling edge of the SystemClk without departing from the spirit and scope of the claimed subject matter.

Referring still to FIG. 3, input data in a parallel state is received by flip flop assembly 302 and clocked by SystemClk to produce clocked input data signal Din_sclk. A reset signal is received by flip flop assembly 304 and is clocked by SystemClk to produce a clocked reset signal Reset_sclk. The clocked reset signal Reset_sclk carries information pertaining to the system clock SystemClk. The clocked input data signal Din_sclk is provided to flip flop assembly 306 where it is clocked by the second clock domain signal TclkPar.

The way that TclkPar is produced, in this example, is as follows. Recall that it is highly desirable, in this specific instance, to place TclkPar right on or very close to the falling edge of the system clock (SystemClk). Since there are five clock edges of Tclk within one clock cycle of the system clock SystemClk (see FIG. 2 where the five clock edges are encircled), there are conceivably five locations to choose from to align TclkPar. Accordingly, generating TclkPar just depends on how counter clock divider circuit 310 is reset. In this example, the clocked reset signal Reset_sclk is provided to flip flop assembly 308 and clocked by Tclk to produce a reset_q signal that is in the Tclk domain. The reset_q signal provides information about where the rising edge of SystemClk is located.

Clock divider circuit 310 receives the reset_q signal at a reset input (designated "reset") and is clocked by Tclk to generate and place TclkPar based on the reset_q signal. The clocked input data signal Din_sclk is thus reclocked by TclkPar and serialized by serializer 312 for transmission as serial data.

To reduce the possibility of metastability, flip flop assembly 308 should be provided as a series of flip flips. Additionally, to further maximize the setup and hold window, the Reset_sclk and Din_sclk signals should be matched. This can cancel the clock-to-q delay of flip flop assemblies 302 and 304, associated wire delay and any added circuitry between flip flop assemblies 302 and 306.

Figure 4:
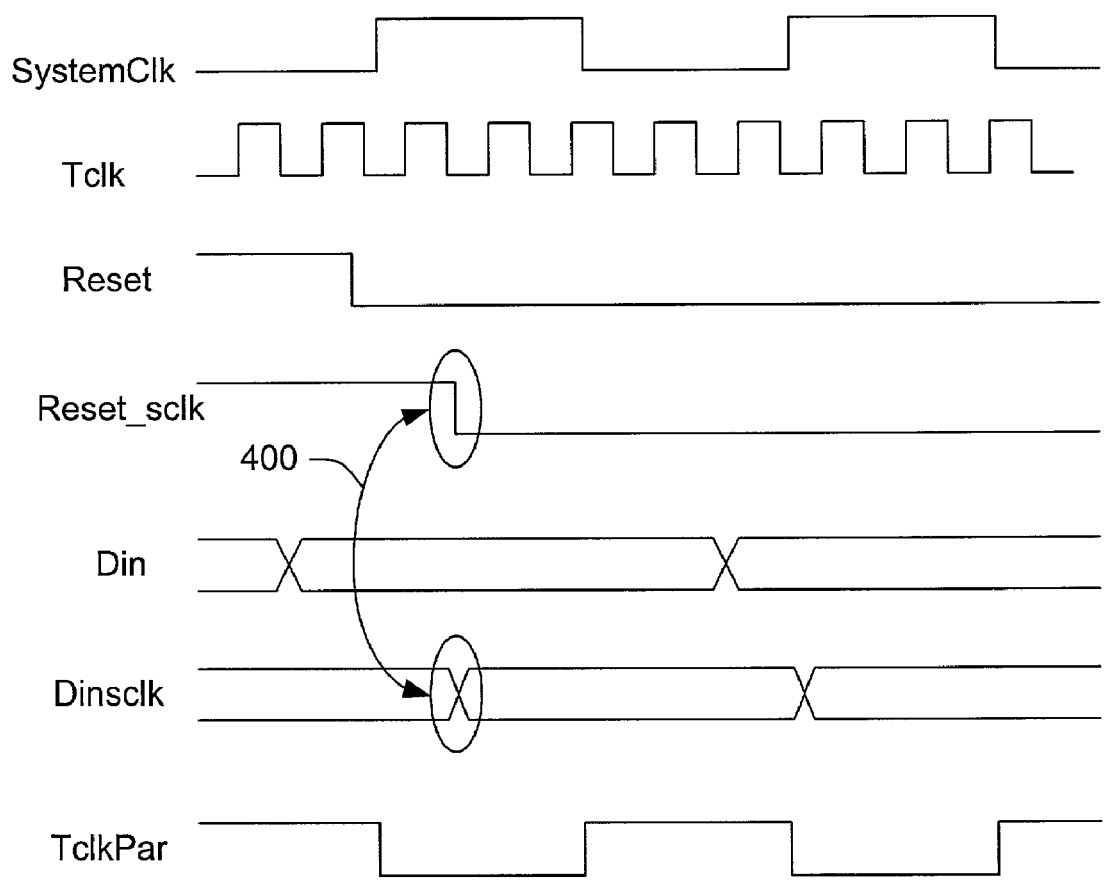
FIG. 4 is a timing diagram of the FIG. 3 transmit parallel interface.

FIG. 4 shows the timing diagram of circuit 300. Note that Reset_sclk and Din_sclk have the same timing as indicated at 400. In the described embodiment, only one constraint is imposed on SystemClk: it needs to be of a dividable frequency of Tclk. There is no constraint on its phase. In other words, one does not need to align SystemClk to any other reference clock. In addition, since no FIFO is needed, the latency is not compromised. Based on Reset_sclk, the 1/N circuit 310 in FIG. 3 places TclkPar from the Tclk edge which is closest to the falling edge of SystemClk. As a result, there is plenty of timing between the Din_sclk transition edges and TclkPar rising edge. Hence, Din_sclk can be safely clocked by TclkPar and sent to Serializer 312 in FIG. 3.

Exemplary Methods

Figure 5:
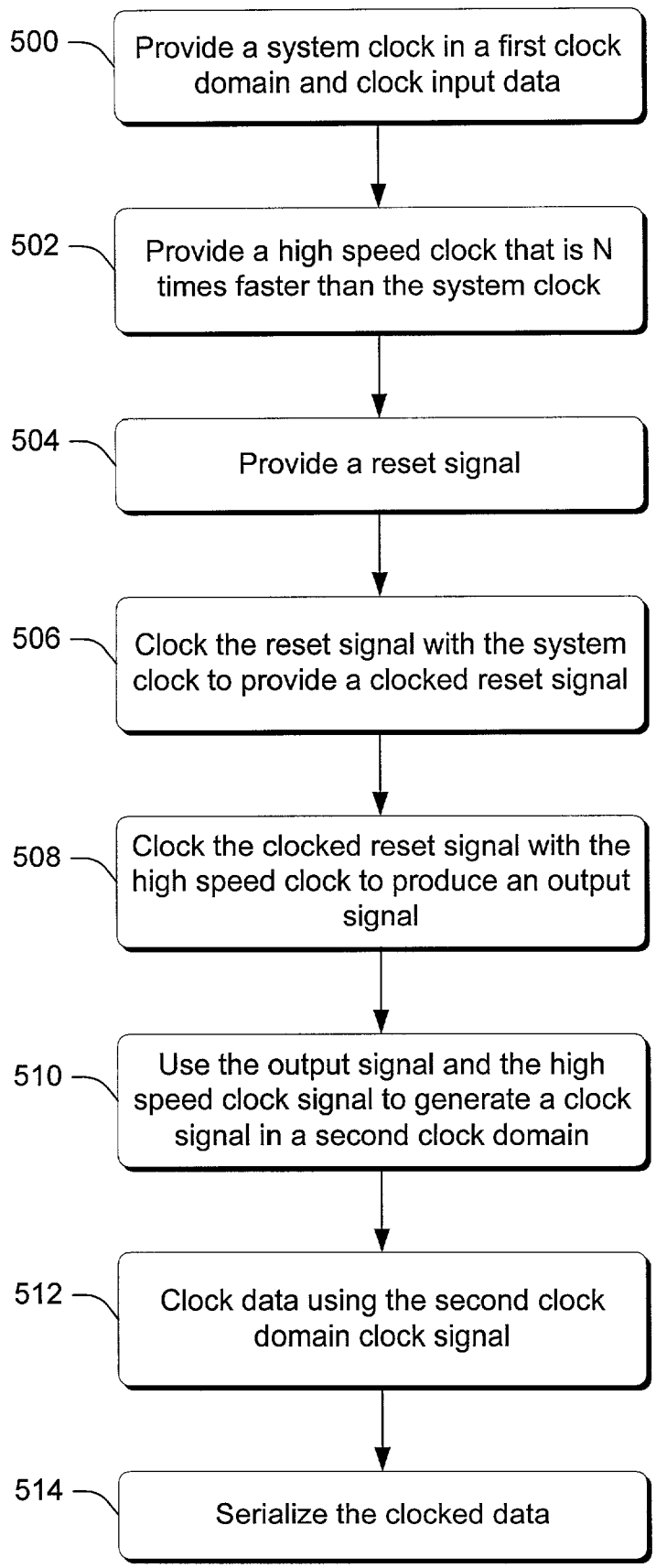
FIG. 5 is a flow diagram that describes steps in a method in accordance with one embodiment.

FIG. 5 shows a flow diagram that describes steps in a method in accordance with one embodiment. In the illustrated and described embodiment, the steps are implemented in digital circuitry. One specific example of digital circuitry is given above in FIG. 3.

FIG. 5 is a flow diagram that describes steps in a method in accordance with one embodiment. In the illustrated and described embodiment, the steps are implemented in digital circuitry.

Step 500 provides a system clock in a first clock domain and clocks input data using the system clock. The system clock frequency is usually set by the user and should be about the same frequency as used by user's core logic. In the FIG. 3 example, the system clock is referred to as SystemClk. In the FIG. 3 example, the reclocked input data is provided as Din_sclk. Step 502 provides a high speed clock that is N times faster than the system clock. In the FIG. 3 example, the high speed clock is referred to as Tclk. Step 504 provides a reset signal and step 506 clocks the reset signal with the system clock to provide a clocked reset signal. In the FIG. 3 example, this step is implemented by flip flop assembly 304 which receives the reset signal and is clocked by the system clock to produce the Reset_sclk signal. Step 508 clocks the clocked reset signal (Reset_sclk) with the high speed clock (Tclk) to produce an output signal. This step is implemented, in the FIG. 3 example, by flip flop assembly 308 which receives the Reset_sclk signal and clocks it to produce an output signal referred to as the reset_q signal.

Step 510 uses the output signal (reset_q) and the high speed system clock to generate a clock signal in a second clock domain. In the FIG. 3 example, the generated clock signal is referred to as "TclkPar". This step is implemented in the FIG. 3 example through the use of a clock divider circuit or counter 310 that is reset using the output signal reset_q so that it selects an appropriate edge of the high speed clock relative to which to generate the second clock domain signal (TclkPar). Step 512 then clocks the input data using the second clock domain signal and step 514 serializes the clocked data for transmission.

CONCLUSION

The embodiments described above can provide improved timing synchronization methods and systems for use with transmit parallel interfaces that reduce clocking complexities and mitigate data latency concerns.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of processing data using a transmit parallel interface comprising:
   providing a system clock signal associated with data in a first clock domain;
   providing a high speed clock signal relative to the system clock signal;
   dividing the high speed clock signal to provide a clock signal in a second clock domain; and
   clocking data using the clock signal in the second clock domain, wherein the system clock signal has rising and falling clock edges, and said dividing the high speed clock signal to provide the clock signal in the second clock domain comprises doing so in a manner that places a rising edge of the clock signal in the second clock domain around the falling edge of the system clock signal.

2. A method of processing data using a transmit parallel interface comprising:
   clocking input data, in a parallel state, using a first clock signal to produce clocked input data, the first clock signal having a frequency;
   clocking a reset signal using the system clock signal to produce a clocked reset signal;
   clocking the clocked reset signal using a high speed clock signal to produce an output signal;
   receiving both the high speed clock signal and the output signal with a divider circuit;
   using the output signal to reset the divider circuit effective to produce a second clock signal having a frequency that is the same as the frequency of the first clock signal; and
   re-clocking the clocked input data using the second clock signal.

3. The method of claim 2, wherein said using of the output signal to reset the divider circuit produces a second clock signal having a rising edge close to a falling edge of the first clock signal.

4. The method of claim 2 further comprising after said re-clocking, serializing re-clocked input data for transmission in a serial state.

5. The method of claim 2, wherein the clocked reset signal and the clocked input data are matched.

6. The method of claim 2, wherein the first clock signal is of a dividable frequency of the high speed clock signal.

7. A transmit parallel interface comprising:
   a single chip;
   integrated circuitry on the chip configured to:
      clock input data, in a parallel state, using a first clock signal to produce clocked input data, the first clock signal having a frequency;
      clock a reset signal using the system clock signal to produce a clocked reset signal;
      clock the clocked reset signal using a high speed clock signal to produce an output signal;
      receive both the high speed clock signal and the output signal with a divider circuit;
      produce, with the divider circuit, a second clock signal that has a frequency that is the same as the frequency of the first clock signal; and
      re-clock the clocked input data using the second clock signal.

8. A transmit parallel interface comprising:
   a first circuit to receive a clocked reset signal and a high speed clock signal and produce therefrom an output signal, the clocked reset signal being clocked by a system clock signal associated with a first clock domain and having a first frequency; and
   a second circuit to receive the high speed clock signal and the output signal from the first circuit to produce therefrom a clock signal in a second clock domain, said second clock domain clock signal having a second frequency that is the same as the first frequency of the system clock signal.

9. The transmit parallel interface of claim 8, wherein the second circuit comprises a divider circuit.

10. The transmit parallel interface of claim 8, wherein the second circuit produces its clock signal such that a rising edge of the produced clock signal is located close to a falling edge of the system clock signal.

11. The transmit parallel interface of claim 8, wherein the system clock signal is at a dividable frequency of the high speed clock signal.

12. The transmit parallel interface of claim 8, wherein the high speed clock signal is greater than or equal to 4 times faster than the system clock signal.

13. The transmit parallel interface of claim 8, wherein the first circuit comprises one or more flip flops that are clocked by the high speed clock signal.

14. The transmit parallel interface of claim 8, wherein the first and second circuits are disposed on a single chip.

15. A transmit parallel interface comprising:
   a first assembly of one or more flip flops configured to receive input data in a parallel state and clock the input data using a system clock signal to produce clocked input data, the system clock having a frequency;
   a second assembly of one or more flip flops configured to receive a reset signal and clock the reset signal with the system clock signal to produce a clocked reset signal;
   a third assembly of one or more flip flops configured to receive the clocked reset signal and clock the clocked reset signal with a high speed clock signal to produce an output signal;
   a circuit configured to receive the output signal and the high speed clock signal and produce therefrom a clock signal that has the same frequency as the system clock signal;
   a fourth assembly of one or more flip flops configured to receive the clocked input data and re-clock the clocked input data using the clock signal having the same frequency as the system clock; and
   a serializer to serialize the re-clocked clocked input data.

16. The transmit parallel interface of claim 15, wherein the system clock signal is a dividable frequency of the high speed clock signal.

17. The transmit parallel interface of claim 15, wherein the first, second, third and fourth assemblies of flip flops, as well as said circuit and serializer are disposed on a single integrated circuit chip.

18. The transmit parallel interface of claim 15, wherein said circuit comprises a divider circuit.

19. The transmit parallel interface of claim 15, wherein said circuit comprises a 1/N divider circuit, where N is greater than or equal to 4.

20. The transmit parallel interface of claim 15, wherein said clock signal having the same frequency as the system clock is produced to have a rising edge located very close a falling edge of the system clock signal.

\* \* \* \* \*